United States Patent
Myrick

[11] Patent Number: 6,119,634
[45] Date of Patent: Sep. 19, 2000

[54] COMBINATION PET RAMP AND UTILITY TABLE

[76] Inventor: Kenneth W. Myrick, 485 Palo Alto Ave., Mountain View, Calif. 94014

[21] Appl. No.: 09/480,867

[22] Filed: Jan. 10, 2000

Related U.S. Application Data

[60] Provisional application No. 60/115,751, Jan. 13, 1999.

[51] Int. Cl.[7] ............................... A01K 29/00; E01D 1/00
[52] U.S. Cl. ........................ 119/847; 119/849; 14/69.5
[58] Field of Search ................................. 119/706, 843, 119/847, 848, 849; 52/182, 183; 14/69.5, 71.1, 71.5; 414/480; D34/32

[56] References Cited

U.S. PATENT DOCUMENTS

| | | | |
|---|---|---|---|
| D. 382,676 | 8/1997 | Holbrook | D34/32 |
| 1,946,000 | 2/1934 | Samuels | 119/849 |
| 2,827,016 | 3/1958 | Jenkins | 119/849 |
| 5,213,060 | 5/1993 | Sloan et al. | 119/847 |
| 5,634,440 | 6/1997 | Mogck | 119/847 |
| 5,933,898 | 8/1999 | Estes et al. | 14/69.5 |
| 6,009,587 | 1/2000 | Beeman | 14/69.5 |

*Primary Examiner*—Peter M. Poon
*Assistant Examiner*—Elizabeth Shaw
*Attorney, Agent, or Firm*—Claude A. S. Hamrick; Oppenheimer, Wolfe & Donnelly LLP

[57] ABSTRACT

A pet ramp assembly including a pair of elongated, molded first and second ramp components hinged together at adjoining ends by a simple pivot pin. A pair of side-locking pins serve the dual purpose of locking the folded structure together and alternatively locking the extended ramp-forming structure in its extended configuration while simultaneously providing additional structural support at the pivot point. The apparatus is made of light-weight, injection molded plastic material, and is provided with a non-slip surface on its upper side. The ground-engaging end and vehicle-engaging end are also specially configured to prevent slippage and dislodgment during use. The apparatus also includes disconnectable legs for allowing the ramp assembly to be used as a grooming table, examination table, game-cleaning table etc.

17 Claims, 3 Drawing Sheets

COMBINATION PET RAMP AND UTILITY TABLE

CROSS REFERENCE TO RELATED APPLICATION

This application claims priority to U.S. Provisional Patent Application Serial No. 60/115,751 entitled "Petstep Pet Ramp & Utility Table", filed Jan. 13, 1999.

BACKGROUND OF THE INVENTION

1. Field of the Invention

The present invention relates generally to animal handling and transport accessory apparatus and more particularly to a new folding ramp and utility table combination suitable for use in loading large pets into vehicles in one mode, and providing a general purpose grooming or examination table in another mode.

2. Description of the Prior Art

Many pet owners prefer large animals to smaller animals and often carry such animals in their pickup trucks or sport utility vehicles. Some of the larger breeds of dogs, for example, may exceed 40 pounds. In order to transport the animals in such vehicles, it is necessary that the animal either jumps or be lifted onto the bed of the vehicle, which is sometimes as much as 2 to 3 feet or more above the ground. When the dog is young and vigorous, it is usually capable of simply jumping into the vehicle. However, as the dog ages, it becomes less able and/or willing to jump into the vehicle and must be assisted, often by lifting, in order to raise it from the ground to the vehicle's floor or transport surface.

The lifting of any large animal creates a potential for injury to both animal and lifter, and should be avoided where possible. Heretofore, simple ramp-like structures have been provided to assist the dog or other animal into the vehicle. Such prior art structures are illustrated in the design patents to Holbrook DES 382676 and Adler DES 412224. A similar structure forming a ramp for allowing a pet to climb from floor to bed top and vice versa is disclosed in the U.S. Patent to Sloan et al., U.S. Pat. No. 5,213,060. Although these ramps attempt to provide solutions to the above described problem, their designs are quite simple and do not appear to be capable of supporting heavy animals, are not of rugged construction, and are not capable of alternative use as a grooming table or other application.

There is therefore a need for a ruggedly-built, foldable pet ramp that is ideally suited for use with sport utility vehicles and the like.

SUMMARY OF THE INVENTION

It is therefore a principle objective of the present invention to provide a portable light-weight ramp apparatus that can be readily folded for transport and storage.

Another object of the invention is to provide an apparatus of the type described which is made of long-lasting, easily cleanable molded plastic material.

Still another object of the present invention is to provide an apparatus of the type described which includes a minimum number of component parts and which is easily assembled without the use of any tools.

Still another object of the present invention is to provide an apparatus of the type described having a non-slip upper surface so as to prevent accidental injury to animals using same.

Briefly, a presently preferred embodiment of the present invention includes a pair of elongated, molded first and second ramp components hinged together at adjoining ends by a simple pivot pin and including a pair of side-locking pins which serve the dual purpose of locking the folded structure together and alternatively locking the extended ramp-forming structure in its extended configuration while simultaneously providing additional structural support at the pivot point. The apparatus is made of light-weight, injection molded plastic material, and is provided with a non-slip surface on its upper side. The ground-engaging end and vehicle-engaging end are also specially configured to prevent slippage and dislodgment during use.

An important advantage of the present invention is that it provides a sturdy, light-weight long-lasting and easily cleanable ramp apparatus suitable for use by dog and other large animal owners with SUVs, pickups, RV's and station wagons. The apparatus also includes disconnectable legs for allowing the ramp apparatus to be used as a grooming table, examination table, game-cleaning table etc.

These and other objects and advantages of the present invention will no doubt become apparent to those skilled in the art after having read the following detailed description of a preferred embodiment illustrated in several figures of the drawing.

IN THE DRAWING

DETAILED DESCRIPTION OF THE PREFERRED EMBODIMENT

Figure 1:
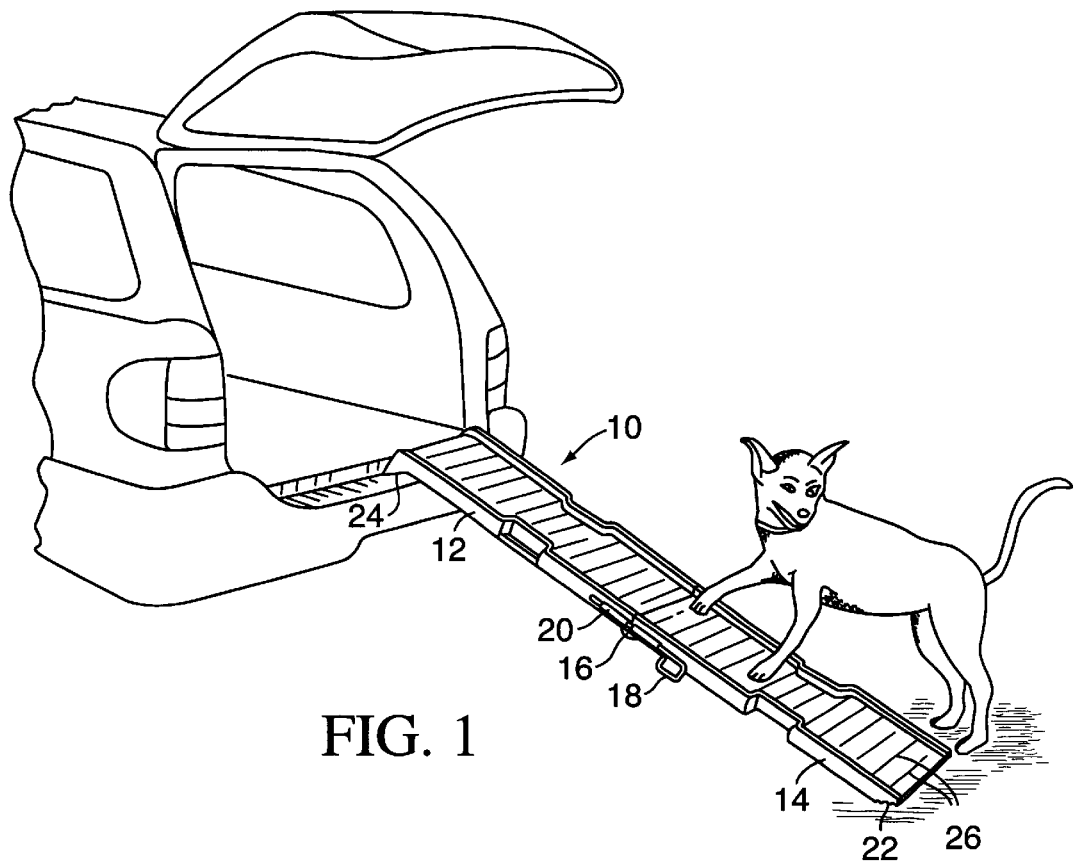
FIG. 1 is a pictorial view illustrating use of a ramp apparatus in accordance with the present invention.

Referring to FIG. 1 of the drawing, a pet ramp apparatus in accordance with the present invention is illustrated at 10, shown in its extended position and disposed to bridge between a ground surface and the rear bumper of an SUV. The apparatus 10 includes an upper unit or component 12 and lower unit or component 14 hingedly attached together by a pivot pin (not shown) at 16, and locked into place by latching pins 18 which extend through tubular receptacles 20 formed on the sides of each ramp component adjacent the pivotally connected junction ends of the ramp components. Note that the lower end 22 of the ramp is configured so as to rest flat upon the ground or paved surface, and the upper end 24 of the ramp is configured to engage the vehicle bumper or other supporting surface in a non-slip engagement. Note that the upper surface of ramp 10 is provided with upstanding, transversely extending ridges 26 and a non-smooth surface so as to provide a non-slip animal supporting surface.

Figure 2:
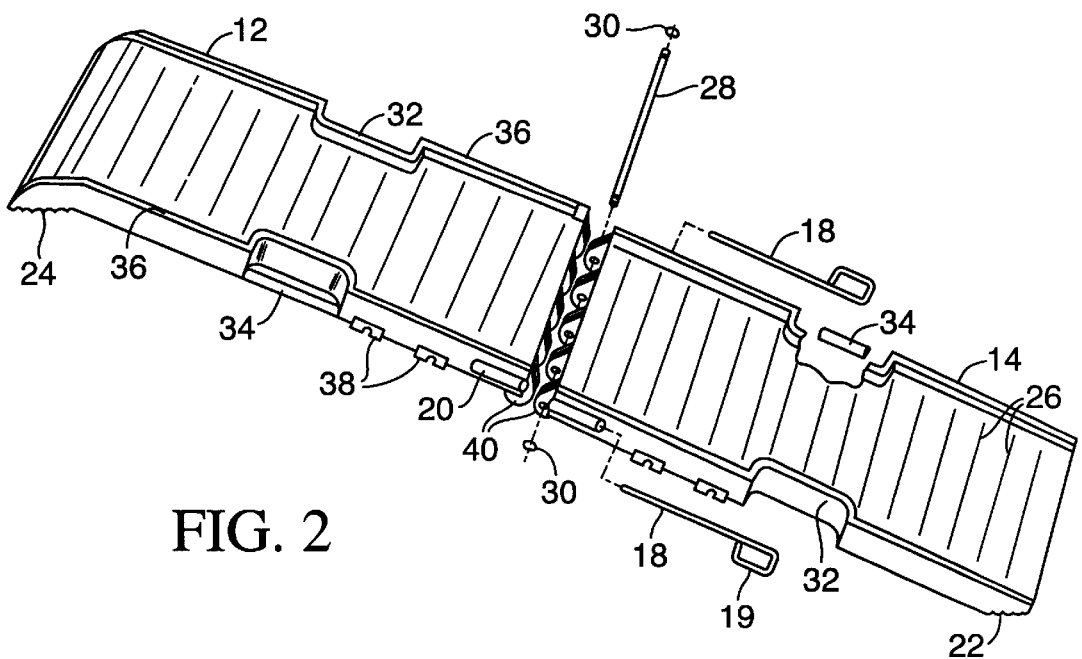
FIG. 2 is an exploded view showing the several components of the ramp apparatus of FIG. 1.

Turning now to FIG. 2 of the drawing, the several components of the ramp apparatus are shown in exploded perspective to depict additional detail of each component part. In addition to the upper ramp component 12 and lower component 14, as well as side latch pins 18, a pivot pin 28 and associated snap-rings 30 are illustrated. In the preferred embodiment, the pins 18 and 28 are made from ½" steel stock. As will be explained in more detail below, cutouts 32 are provided in each side of each ramp component 12 and 14, and handlebars 34 span the cutouts on opposite sides of each component. Each ramp component also includes an upstanding sidewall 36 and a pair of latch-pin engaging detents or tabs 38 to be further described below. At the adjacent ends of each component 12, 14 outwardly extending pivot flanges 40 are provided for receiving the pivot pin 28.

Figures 3, 3A:
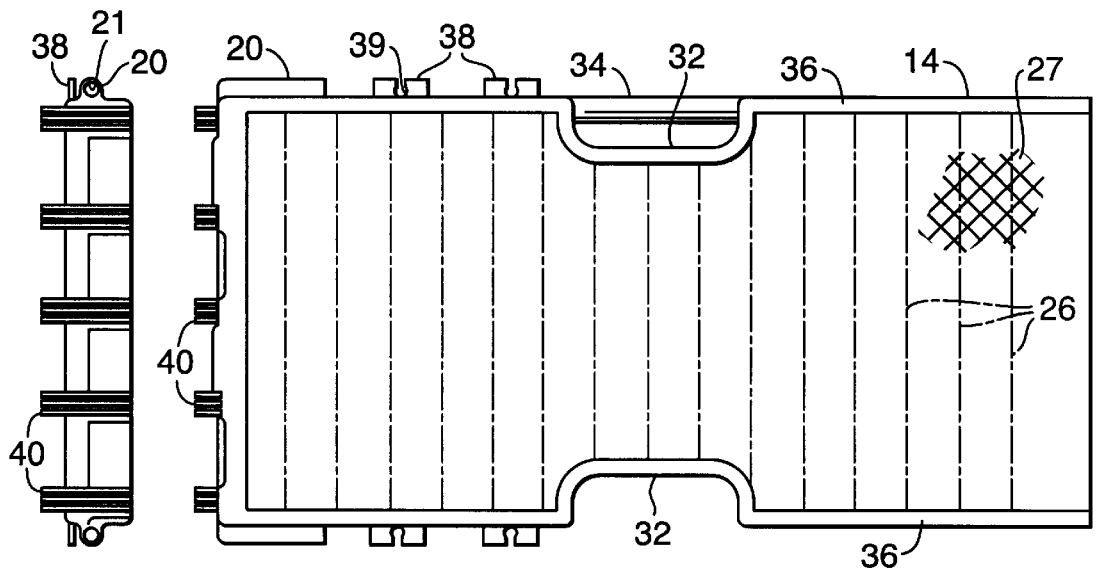
FIG. 3 is a plan view showing the upper surface of one of the two ramp-forming components of the embodiment of FIG. 1.
FIG. 3a is an elevational view illustrating the pivot end of the ramp component of FIG. 3.
Figure 4:
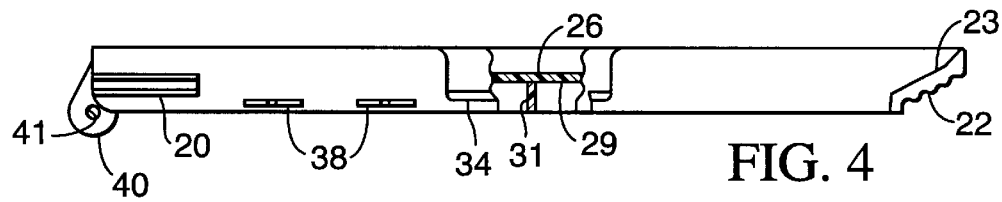
FIG. 4 is a partially broken side elevational view of the ramp component of FIG. 3.
Figure 5:
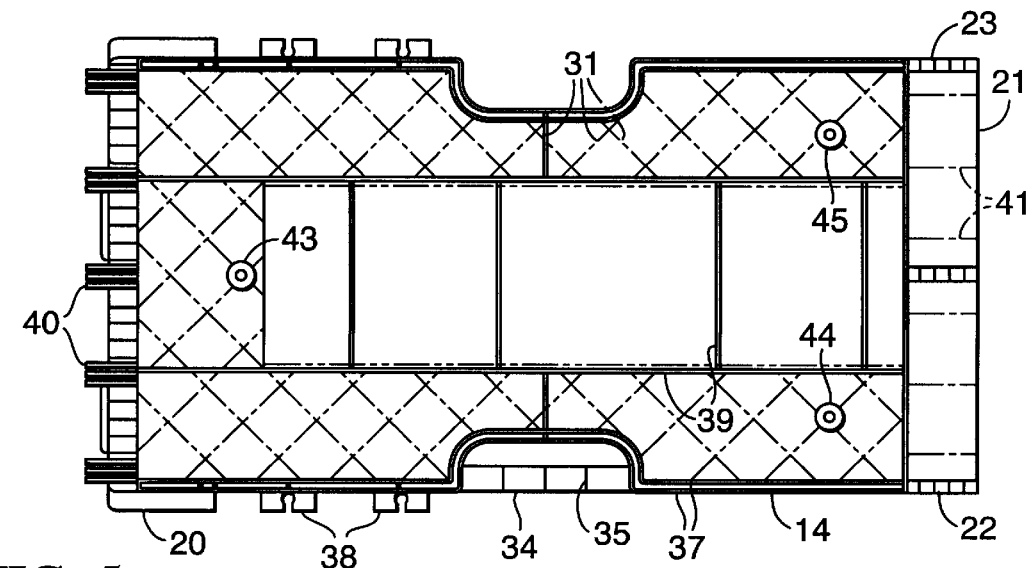
FIG. 5 is a bottom plan view of the ramp component of FIG. 3.

Turning now to FIGS. 3–5, specific detail of the best mode of the component 14 is depicted in top side end and bottom views. As illustrated in these figures, the lower component 14 (as well as the upper component 12) is an injection molded part formed of rugged polypropylene and glass fiber-embedded plastic material, and includes an upper surface having ridges 26 and a texture as suggested at 27 so as to provide a slip-resistant surface. Sidewalls 36 extend above the ramp surface 27 by approximately 1 inch and wrap around the cutouts 32. Note that in the upper part of FIG. 3, a handlebar 34 extends across the cutout to provide a means for carrying the assembly. The cylindrical receptacles 20 (FIG. 3A) have a cylindrical or otherwise configured bore 21 extending therethrough or thereinto for receiving the locking pin 18 (FIG. 2). The tabs 38 define notches 39 which are generally u-shaped with the upper portions thereof slightly constricted so as to snappingly receive and retain the looped end 19 (FIG. 2) of the pin 18 when it is inserted into the bore 21. As depicted in FIG. 3 the leftmost tabs 38 are intended to hold the pins 18 (not shown) in position when they locks the units 12 and 14 together in the extended configuration (FIG. 1) while the rightmost tabs 38 are used to hold the pins 18 in their retracted position so that the units can be folded into their folded configuration. Note that the flanges 40 are formed in groups of 3 and are slightly offset laterally toward the top (actually the right side) of the unit as depicted in FIG. 3. This facilitates interdigitated engagement with corresponding flanges of the upper unit 12 as will be further described below.

As best illustrated in the side view of FIG. 4, the flanges 40 include circular apertures 41 that are axially aligned for receiving the pivot pin 28 (FIG. 2) when the upper and lower units are assembled. At the other end of unit 14, the inclined end portion 22 has a non-skid surface which, in the preferred embodiment, is formed by a flexible attachment 23 having a stair-stepped lower surface so as to provide a positive engagement with either hard or soft ground surfaces.

As is illustrated in the broken central segment of FIG. 4, it will be appreciated, in addition to the side walls 36, that the molded unit is comprised of a thin horizontally-extending web 29 that is stiffened by vertically extending ribs 31 which, as depicted in the bottom view of FIG. 5, also extends both diagonally across the unit as well as transversely as well as longitudinally relative to the length of the unit. As also depicted in FIG. 5, planar rigidity is maintained by the sidewall forming ribs 37 as well as the longitudinally and transversely extending stiffener ribs 39. Note that longitudinally extending stiffening ribs 41 are also provided beneath the tapered end portion 22 of the unit. For embodiments intended to carry extremely heavy loads it may be desirable to strengthen the ramp units by affixing rigid metal rods or tubes to the bottom of each unit. In one such embodiment, the stiffening ribs 31 and lateral ribs 39 (FIG. 5) are notched to receive two or more longitudinally extending rods disposed between the longitudinally extending ribs 39.

In addition, cylindrical blocks 43, 44 and 45 are provided at several rib intersections. These blocks have a central bore provided therein for receiving a threaded stud affixed to the end of a leg, as will be described below.

In an alternative embodiment eight legs are used rather than six as depicted, i.e., two leg receiving receptacles are provided at each end of the ramp units.

Note also that the handlebars 34 are semicircular in cross-section and stiffened by transversely extending ribs 35. Although such handlebars could be provided on both sides of the unit, it has been found that provision on a single side is suitable for facilitating carriage of the assembly. Furthermore, the provision of a single handlebar on each unit eliminates potential pinching of the hand between the two ramp forming units when they are in their folded, transport or storage configuration.

Figure 6:
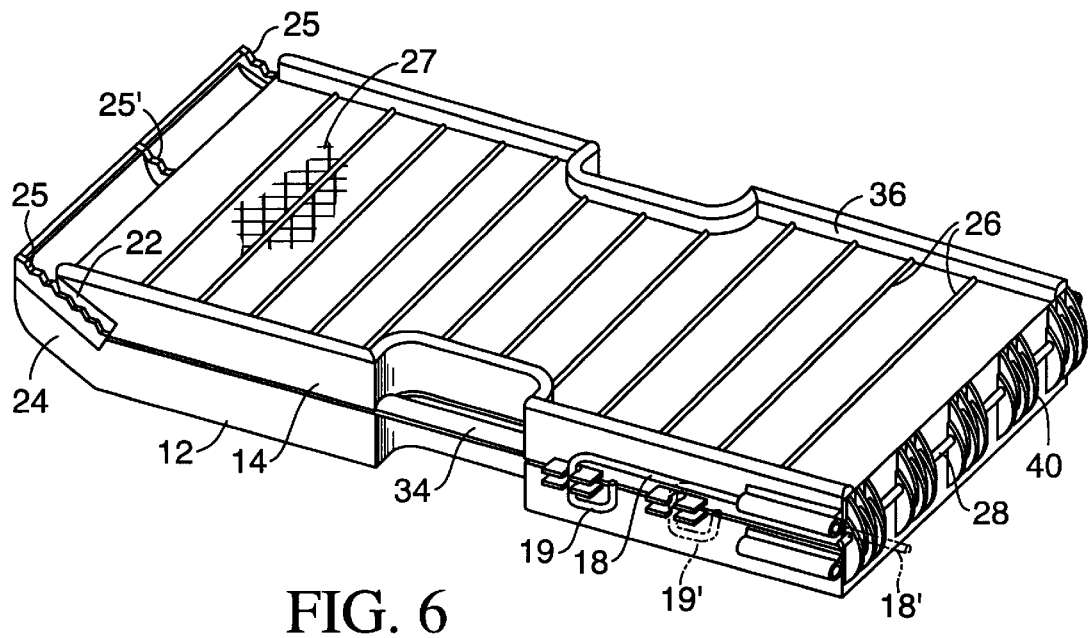
FIG. 6 illustrates an assembled ramp apparatus folded into its transportable configuration.

Moving now to FIG. 6 of the drawing, the two ramp units 12 and 14 are shown in their assembled and folded configuration held together by the pivot pin 28 and the looped ends 19 of the locking pins 18. The near side pin 18 is also shown in dashed lines 18' and 19' in its extended position as it would be deployed to lock the two units together when they are rotated into their extended, ramp forming configuration. Note that the units 12 and 14 are identical in every respect except the end portions at 22 and 24. Whereas the end of the upper unit 14 is beveled to provide a ground engaging surface, the end portion 24 of upper unit 12 is turned down (turned up as depicted in FIG. 6) to provide a bumper or other platform engaging surface 25. This end portion is also provided in the preferred embodiment with an attached, resilient and step-shaped part 25. An interior part 25' may be formed either of a molded part that is integral with the ramp 12 or may be a separate add-on resilient part similar to the parts 25. Note also in this figure how the flanges 40 of the upper and lower units interdigitate and combine with pin 28 to provide the hinged attachment of the two units.

As shown in FIG. 6, as well as in other Figs., the surfaces of the ramp units are made "non-slip" by molding upstanding, transversely extending ridges thereinto. Although these ridges are shown as being parallel to each other and repeated at regular intervals, it will be appreciated that the ribs could be of any suitable configuration. For example, in addition to, or in place of, the transverse ribs 26 longitudinally extending ribs or surface slots could be used. Moreover, the ribs or slots could extend diagonally across the surfaces. Alternatively, a pocked or pebbled surface could be used in place of, or in addition to, the ribs. As still another alternative, a resilient or rubberized sheet of material could be affixed to the surface.

Figure 7:
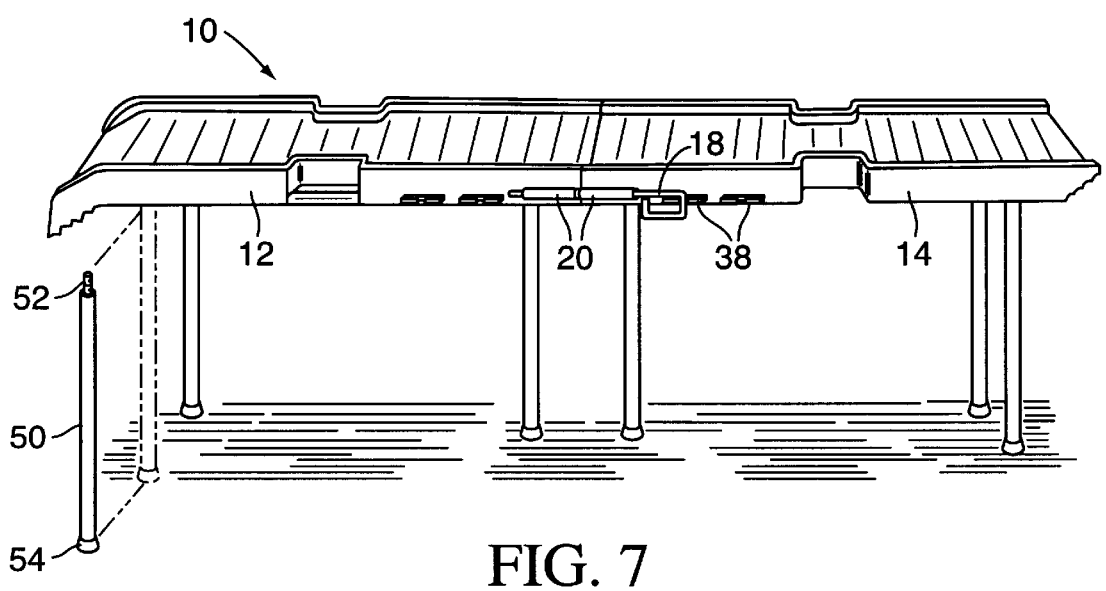
FIG. 7 illustrates an apparatus in accordance with the present invention having legs affixed thereto to form a utility table.

In FIG. 7 of the drawing, an extended ramp is illustrated configured as a grooming table or the like. This configuration is achieved by simply screwing six legs into the cylindrical receptacles 43–35 (FIG. 5). Note that each leg 50 includes a threaded stud 52 at one end and a suitable foot pad 54 at the other end. In the preferred embodiment, the legs 50 are molded or extruded members having a threaded stud 52 and foot pad 54 added thereto. In the preferred embodiment, pad 54 is a resilient cup-shaped part that fits over the lower end of the leg 50 and provides a non-slip characteristic to that end of the leg.

Another use for the present invention is to provide a pair of stairs for facilitating entry into a vehicle. In this application, the ramp units are separated, and four long length legs are affixed to one of the units and four half length legs are affixed to the other unit to form tall and short "tables" or steps. The "tables" are then positioned in side-by-side relationship adjacent a surface to be mounted, thereby providing a pair of step like platforms that can be stepped upon to provide ingress and egress to a raised surface such as a truck bed, retaining wall, etc.

Still another use of the ramp units, taken in either singular form or joined together, is to provide a bridge between a dock and a boat, or between any other two separated surfaces.

An important aspect of the present invention is that with the exception of the end portions 22 and 24, both units are structurally identical. This means that a single mold having substitutable end parts, can be used to make both units, thereby reducing the manufacturing cost of the assembly.

Although the present invention has been described above in terms of a particular embodiment it is anticipated that alterations and variations thereof will become apparent to those skilled in the art. It is therefore intended that the appended claims be interpreted as covering all such alterations and modifications as fall within the true spirit and scope of the invention.

What is claimed is:

1. A pet ramp assembly comprising:
   a first molded unit forming a generally rectangular first ramp component having a first end portion configured to engage a first surface and a second end portion including a plurality of apertured first flanges, means forming stiffening walls on opposite sides of said first ramp component, said first component having a cutout formed therein along at least one side thereof midway along its length with handle means formed therein;
   a second molded unit forming a generally rectangular second ramp component having another first end portion configured to engage a second surface remote from said first surface, another second end portion including a plurality of apertured second flanges, means forming stiffening walls on opposite sides of said second ramp component, said second ramp component having a cutout formed therein along at least one side thereof midway along its length with handle means formed therein; and
   at least one pivot pin adapted to extend through the apertures in said first and second flanges so as to pivotally join said first unit to said second unit,
   wherein said assembly may be rotated about said pivot pin between a folded configuration with said first and second units lying in parallel side-by-side relationship, and an extended configuration wherein said first and second units lie within a common plane such that upon placement of said first end portion on a first surface and placement of said second end portion on a second surface, said assembly forms a ramp along which a pet can walk.

2. A pet ramp assembly as recited in claim 1 and further comprising means for locking said first and second units in at least one of said first and second configurations.

3. A pet ramp assembly as recited in claim 2 wherein said means for locking includes an elongated bore formed in at least one of said sidewalls of each of said first and second units at points proximate said apertured flanges, and an elongated shaft which, when extended through the elongated bore of each said unit, locks said assembly in said extended configuration.

4. A pet ramp assembly as recited in claim 1 wherein said first end portion is beveled to mate with a first supporting surface when the assembly is in its extended configuration and inclined to extend between supporting surfaces at different elevations.

5. A pet ramp assembly as recited in claim 4 wherein said another first end portion is inclined relative to the length of said second molded unit so as to matingly engage a second supporting surface at a higher elevation than the first supporting surface.

6. A pet ramp assembly as recited in claim 1 wherein said first and second molded units have generally planar upper surfaces extending between said stiffening walls, said upper surfaces having non-slip means integrally formed therein to improve frictional engagement between a pet's paws and the upper surfaces.

7. A pet ramp assembly as recited in claim 6 wherein said non-slip means is provided by ridges formed in said upper surfaces and extending transversally across the length of each said unit at regular intervals.

8. A pet ramp assembly as recited in claim 1 and further comprising a network of intersecting ribs formed in the bottom surfaces of said units to increase the strength and rigidity thereof.

9. A pet ramp assembly as recited in claim 8 and further including screw blocks integrally formed at spaced locations on the bottom surface of said units, and further comprising a plurality of elongated legs having a threaded fastening member attached to one end thereof, each said threaded fastening member being adapted to threadably engage one of said screw blocks to form a leg for supporting said pet ramp assembly, whereby said pet ramp assembly can alternatively be used as a grooming table or the like.

10. A pet ramp assembly as recited in claim 1 wherein said first and second flanges are asymmetrically disposed along said second and another second end portions respectively, such that when said second and fourth end portions are adjoined, said first and second flanges interdigitate.

11. A pet ramp assembly as recited in claim 10 wherein said first end portion is beveled to mate with a first supporting surface when the assembly is in its extended configuration and inclined to extend between supporting surfaces at different elevations.

12. A pet ramp assembly as recited in claim 11 wherein said another first end portion is inclined relative to the length of said second molded unit so as to matingly engage a second supporting surface at a higher elevation than the first supporting surface.

13. A pet ramp assembly as recited in claim 12 wherein said first and second molded units have generally planar upper surfaces extending between said stiffening walls, said upper surfaces having non-slip means integrally formed therein to improve frictional engagement between a pet's paws and the upper surfaces.

14. A pet ramp assembly as recited in claim 13 and further including screw blocks integrally formed at spaced locations on the bottom surface of said units, and further comprising a plurality of elongated legs having a threaded fastening member attached to one end thereof, each said threaded fastening member being adapted to threadably engage one of said screw blocks to form a leg for supporting said pet ramp assembly, whereby said pet ramp assembly can alternatively be used as a grooming table or the like.

15. A pet ramp assembly as recited in claim 12 and further comprising a network of intersecting ribs formed in the bottom surfaces of said units to increase the strength and rigidity thereof.

16. A pet ramp assembly as recited in claim 15 and further comprising means for locking said first and second units in at least one of said first and second configurations.

17. A pet ramp assembly as recited in claim 16 wherein said means for locking includes an elongated bore formed in at least one of said sidewalls of each of said first and second units at points proximate said apertured flanges, and an elongated shaft which, when extended through the elongated bore of each said unit, locks said assembly in said extended configuration.

* * * * *